United States Patent
Narita et al.

(10) Patent No.: US 11,408,531 B2
(45) Date of Patent: Aug. 9, 2022

(54) SPOOL VALVE

(71) Applicant: KAWASAKI JUKOGYO KABUSHIKI KAISHA, Kobe (JP)

(72) Inventors: Shinji Narita, Akashi (JP); Hideki Tanaka, Nishinomiya (JP); Kazuto Fujiyama, Kobe (JP); Kazuya Matsumoto, Kako-gun (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/056,102

(22) PCT Filed: May 17, 2018

(86) PCT No.: PCT/JP2018/019181
§ 371 (c)(1),
(2) Date: Nov. 17, 2020

(87) PCT Pub. No.: WO2019/220600
PCT Pub. Date: Nov. 21, 2019

(65) Prior Publication Data
US 2021/0207731 A1 Jul. 8, 2021

(51) Int. Cl.
*F16K 31/04* (2006.01)
*F15B 13/04* (2006.01)
(Continued)

(52) U.S. Cl.
CPC ........ *F16K 31/047* (2013.01); *F15B 13/0402* (2013.01); *F16K 11/07* (2013.01);
(Continued)

(58) Field of Classification Search
CPC ...... F16K 31/047; F16K 31/508; F16K 31/04; F16K 11/07; F16K 3/14; F16K 25/2204; F16K 2061/0253; F15B 13/0402
See application file for complete search history.

(56) References Cited

U.S. PATENT DOCUMENTS 3,891,145 A * 6/1975 Bartholomaus ........... F15B 9/10
137/625.6
4,170,081 A * 10/1979 Kiejzik ..................... B42F 5/00
206/455
(Continued)

FOREIGN PATENT DOCUMENTS

JP        S61-294274 A     12/1986
JP        S62-122971 U      8/1987
(Continued)

OTHER PUBLICATIONS

Aug. 7, 2018 Search Report issued in International Patent Application No. PCT/JP2018/019181.

*Primary Examiner* — Patrick C Williams
(74) *Attorney, Agent, or Firm* — Oliff PLC

(57) ABSTRACT

A spool valve capable of suppressing deterioration of position controllability of a spool due to misalignment includes: a housing including a spool hole; a spool inserted into the spool hole of the housing so as to be movable in an axial direction; and an electric actuator configured to move the spool in the axial direction. The electric actuator includes: an electric motor configured to rotate an output shaft; a linear-motion converting mechanism including a linear-motion member configured to be linearly movable, the linear-motion converting mechanism being configured to convert a rotational motion of the output shaft into a linear motion of the linear-motion member; and a coupling member coupling the linear-motion member and the spool moves in accordance with the linear motion of the linear-motion member. The coupling member allows one of tilt and eccentricity of an axis of the spool relative to an axis of the linear-motion member.

11 Claims, 9 Drawing Sheets

(51) Int. Cl.
  *F16K 11/07* (2006.01)
  *F16K 31/50* (2006.01)
  *F16H 25/22* (2006.01)
  *F16H 61/02* (2006.01)
  *F16K 3/314* (2006.01)

(52) U.S. Cl.
  CPC ........ *F16K 31/508* (2013.01); *F16H 25/2204* (2013.01); *F16H 2061/0253* (2013.01); *F16K 3/314* (2013.01); *F16K 31/04* (2013.01)

(56) References Cited

U.S. PATENT DOCUMENTS

| | | | | |
|---|---|---|---|---|
| 4,733,585 | A * | 3/1988 | Link | B23Q 5/36 137/625.65 |
| 6,334,462 | B1 * | 1/2002 | Dore | F15B 13/0402 137/625.65 |
| 7,066,189 | B2 * | 6/2006 | Tranovich | F15B 13/0402 137/1 |
| 2017/0211699 | A1 | 7/2017 | Sasanuma et al. | |
| 2018/0274691 | A1 * | 9/2018 | Biwersi | F15B 20/008 |

FOREIGN PATENT DOCUMENTS

| | | |
|---|---|---|
| JP | H03-00381 U | 1/1991 |
| JP | H03-009572 Y2 | 3/1991 |
| JP | H09-144931 A | 6/1997 |
| JP | 2001-165344 A | 6/2001 |
| JP | 2005-240877 A | 9/2005 |
| JP | 5666174 B2 | 2/2015 |
| JP | 2016-033400 A | 3/2016 |

* cited by examiner

SPOOL VALVE

TECHNICAL FIELD

The present invention relates to a spool valve configured to move a spool by an electric actuator.

BACKGROUND ART

A spool valve is known as one of control valves. The spool valve can control the flow direction and flow rate of operating oil in accordance with the position of a spool. Known as the spool valve are a pilot-driven spool valve configured to apply pilot pressure to a spool to change the position of the spool and an actuator-driven spool valve configured to change the position of the spool by a linear-motion actuator. Known as the latter actuator-driven spool valve is, for example, a multiple direction switching valve of PTL 1. In the multiple direction switching valve of PTL 1, an output shaft of an electric motor is coupled to a spool through a ball screw reduction gear. With this, when the output shaft of the electric motor rotates, the spool moves in an axial direction thereof. Thus, the position of the spool changes.

CITATION LIST

Patent Literature

PTL 1: Japanese Patent No. 5666174, Description

SUMMARY OF INVENTION

Technical Problem

In the multiple direction switching valve of PTL 1, the output shaft of the motor and the spool are coaxially arranged, i.e., an axis of the output shaft of the motor and an axis of the spool coincide with each other. However, misalignment between the output shaft of the motor and the spool may occur due to, for example, misalignment caused during assembling. When the motor is driven to move the spool in this misalignment state, the spool moves while being pressed against a housing. In this case, sliding resistance of the spool when the misalignment is present is larger than that when the misalignment is absent. Thus, position controllability of the spool deteriorates.

An object of the present invention is to provide a spool valve capable of suppressing deterioration of position controllability of a spool due to misalignment.

Solution to Problem

A spool valve of the present invention includes: a housing including a spool hole; a spool inserted into the spool hole of the housing so as to be movable in an axial direction; and an electric actuator configured to move the spool in the axial direction. The electric actuator includes an electric motor configured to rotate an output shaft, a linear-motion converting mechanism including a linear-motion member configured to be linearly movable, the linear-motion converting mechanism being configured to convert a rotational motion of the output shaft into a linear motion of the linear-motion member, and a coupling member coupling the linear-motion member and the spool such that the spool moves in accordance with the linear motion of the linear-motion member. The coupling member allows at least one of tilt and eccentricity of an axis of the spool relative to an axis of the linear-motion member.

According to the present invention, even when the axis of the output shaft and the axis of the spool tilt relative to each other or are eccentric to each other in a certain direction, i.e., even when misalignment occurs, the misalignment in the certain direction can be absorbed by the coupling member. To be specific, the spool can be held in the spool hole without receiving a bending moment. With this, the spool can be prevented from being pressed against an inner peripheral surface of the housing at the time of start-up or during operation. To be specific, an increase in friction force acting on the spool due to the misalignment can be suppressed, and deterioration of position controllability of the spool due to the misalignment can be suppressed.

In the above invention, the coupling member may allow the tilt of the spool relative to the linear-motion member in all directions perpendicular to the axial direction.

According to the above configuration, even when the axis of the spool tilts relative to the axis of the output shaft in any direction, the misalignment due to the tilt can be absorbed. With this, positional accuracy of the spool relative to the electric actuator at the time of assembling can be suppressed to a low level. Thus, the assembling can be facilitated.

In the above invention, the coupling member may be constituted by a ball joint including a motor-side coupling portion provided at the linear-motion member, a spool-side coupling portion provided at the spool, and a ball interposed between the motor-side coupling portion and the spool-side coupling portion to couple the motor-side coupling portion and the spool-side coupling portion, the motor-side coupling portion and the spool-side coupling portion being configured to rotate relative to each other about a center point of the ball.

According to the above configuration, a ball joint constituted by the two coupling portions and the ball and having a simple structure is adopted as the coupling member. Therefore, complication of the structure of the spool valve can be suppressed, and the number of parts of the spool valve can be made small. With this, the manufacturing cost of the spool valve can be suppressed.

In the above invention, the coupling member may allow the eccentricity of the spool relative to the linear-motion member in all directions perpendicular to the axial direction.

According to the above configuration, even when the axis of the spool is eccentric to the axis of the output shaft in any direction, the misalignment due to the eccentricity can be absorbed. With this, the positional accuracy of the spool relative to the electric actuator at the time of assembling can be suppressed to a low level. Thus, the assembling can be facilitated.

In the above invention, the coupling member may include a motor-side coupling portion provided at the linear-motion member and a spool-side coupling portion provided at the spool, and the motor-side coupling portion and the spool-side coupling portion may be configured to be displaceable relative to each other in two directions which are perpendicular to each other and are perpendicular to the axial direction.

According to the above configuration, the coupling member having a simple structure is adopted. Therefore, the complication of the structure of the spool valve can be suppressed, and the number of parts of the spool valve can be made small. With this, the manufacturing cost of the spool valve can be suppressed.

In the above invention, the spool valve may further include a biasing mechanism configured to apply biasing force against a load received by the spool from the electric actuator in the axial direction. The spool may move toward a first side or a second side in the axial direction from a neutral position by the load applied from the electric actuator. The electric actuator may be coupled to one of axial end portions of the spool. The biasing mechanism may apply the biasing force to the spool against the load from the electric actuator such that the spool returns to the neutral position. The biasing mechanism may be arranged close to the other axial end portion of the spool.

According to the above configuration, the spring mechanism can mechanically return the spool to the neutral position. Therefore, by stopping the driving of the motor of the electric actuator, the spool can return to the actual neutral position. Thus, reproducibility of the movement to the neutral position can be improved.

A spool valve of the present invention includes: a housing including a spool hole; a spool inserted into the spool hole of the housing so as to be movable in an axial direction; an electric actuator configured to apply pressing force to the spool to move the spool toward a first side in the axial direction; and a biasing mechanism configured to bias the spool toward a second side in the axial direction against the pressing force of the electric actuator. The electric actuator includes an electric motor configured to rotate an output shaft, a linear-motion converting mechanism including a linear-motion member configured to be linearly movable, the linear-motion converting mechanism being configured to convert a rotational motion of the output shaft into a linear motion of the linear-motion member, and a contact member including a pressing portion formed in a partially spherical shape, the contact member being provided at the linear-motion member while being pressed against the spool by the biasing mechanism.

According to the present invention, since the contact member is pressed against the spool by the biasing mechanism, the pressing force of the electric actuator can be applied to the spool through the contact member to move the spool. Moreover, since the pressing portion of the contact member is formed in a partially spherical shape, the pressing portion and the spool can be brought into point contact with each other. With this, even when the axis of the output shaft and the axis of the spool are misaligned relative to each other, such misalignment can be absorbed. To be specific, the spool can be held in the spool hole without receiving the bending moment. With this, the spool can be prevented from being pressed against the inner peripheral surface of the housing at the time of start-up or during operation. To be specific, the increase in the friction force acting on the spool due to the misalignment can be suppressed, and the deterioration of the position controllability of the spool due to the misalignment can be suppressed.

Advantageous Effects of Invention

According to the present invention, the deterioration of the position controllability of the spool due to the misalignment can be suppressed.

BRIEF DESCRIPTION OF DRAWINGS

FIG. 4A shows that a spool-side coupling portion is inclined toward one side in a first direction. FIG. 4B shows that the spool-side coupling portion is inclined toward one side in a second direction.

FIG. 5A shows that the spool is located at a neutral position. FIG. 5B shows that the spool moves from the neutral position toward a first side in an axial direction.

FIG. 6A shows that the spool-side coupling portion slides toward the other side in the first direction. FIG. 6B shows that the spool-side coupling portion slides toward the other side in the second direction.

FIG. 8A shows the actual position results of the spool valve shown in FIG. 1. FIG. 8B shows the actual position results of a spool valve of conventional art.

DESCRIPTION OF EMBODIMENTS

Figure 1:
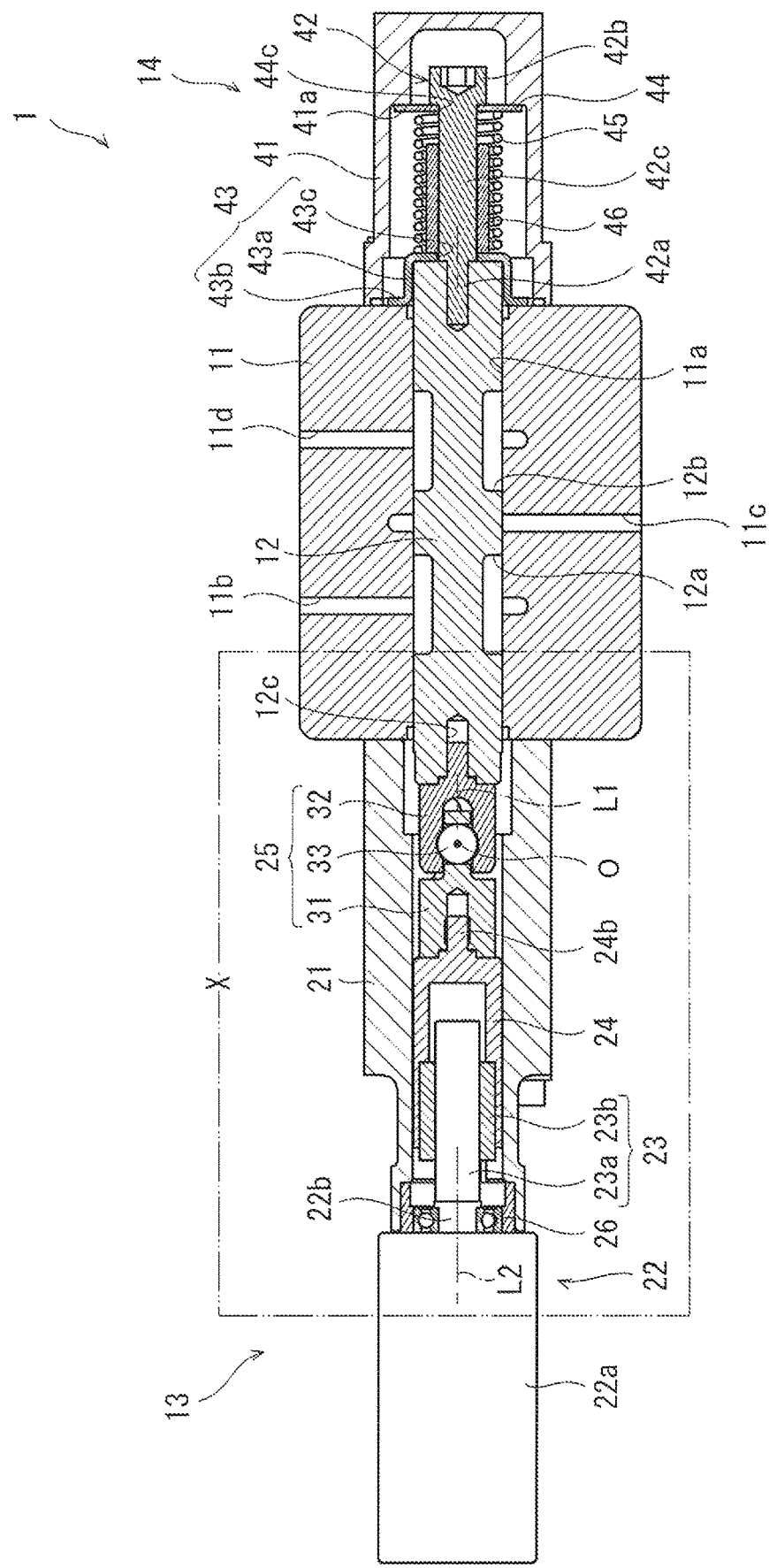
FIG. 1 is a sectional view showing a spool valve according to Embodiment 1 of the present invention.

Hereinafter, spool valves 1 and 1A according to Embodiments 1 and 2 of the present invention will be described with reference to the drawings. It should be noted that directions stated in the following description are used for convenience sake, and directions and the like of components of the present invention are not limited. Moreover, each of the spool valves 1 and 1A described below is just one embodiment of the present invention. Therefore, the present invention is not limited to the embodiments. Additions, deletions, and modifications may be made within the scope of the present invention.

Embodiment 1

An industrial machine, such as a construction machine, includes a hydraulic supply device configured to supply operating oil to an actuator. The actuator drives at a speed corresponding to the flow rate of the supplied operating oil. In order to control the flow rate of the operating oil supplied to the actuator, the hydraulic supply device includes a spool valve 1 shown in FIG. 1. The spool valve 1 is a linear-motion electric spool valve and includes a housing 11, a spool 12, an electric actuator 13, and a spring mechanism 14. The housing 11 is, for example, a valve block. A spool hole 11a and a plurality of oil passages (in the present embodiment, three oil passages) 11b to 11d are formed at the housing 11. The spool hole 11a extends in a predetermined direction so as to penetrate the housing. The three oil passages 11b to 11d are connected to the spool hole 11a at different positions. Moreover, each of the three oil passages 11b to 11d is connected to a hydraulic pump, an actuator, or the like (not shown), and the operating oil flows through the three oil passages 11b to 11d. The spool 12 is inserted into the spool hole 11a of the housing 11 configured as above.

The spool 12 is a substantially columnar member extending in an axial direction thereof. An outer diameter of the spool 12 substantially coincides with a diameter of the spool hole 11a. Moreover, a plurality of circumferential grooves (in the present embodiment, two circumferential grooves 12a and 12b) are formed on an outer peripheral surface of the spool 12. Each of the circumferential grooves 12a and 12b extends on the outer peripheral surface of the spool 12 entirely in the circumferential direction. Moreover, the circumferential grooves 12a and 12b are arranged so as to correspond to the three oil passages 11b to 11d with the spool 12 inserted in the spool hole 11a. For example, when the spool 12 is located at a neutral position as shown in FIG. 1, the two circumferential grooves 12a and 12b are respectively connected to the first and third oil passages 11b and 11d located at left and right sides. Moreover, when the spool 12 moves to a first side in the axial direction (i.e., when the spool 12 moves in a right direction in FIG. 1), the first circumferential groove 12a located at the left side connects the first oil passage 11b and the second oil passage 11c. Furthermore, when the spool 12 moves to a second side in the axial direction (i.e., when the spool 12 moves in a left direction in FIG. 1), the second circumferential groove 12b located at the right side connects the third oil passage 11d and the second oil passage 11c.

As above, the spool 12 can change its position to switch a connection status of the three oil passages 11b to 11d and adjust an opening degree of the oil passages 11b to 11d connected to each other. To be specific, the spool 12 allows the operating oil to flow in a direction corresponding to the position of the spool 12 at a flow rate corresponding to the position of the spool 12. One axial end portion and the other axial end portion of the spool 12 having such functions project from the housing 11. The electric actuator 13 is provided at the one axial end portion of the spool 12, and the spring mechanism 14 is provided at the other axial end portion of the spool 12.

Figure 2:
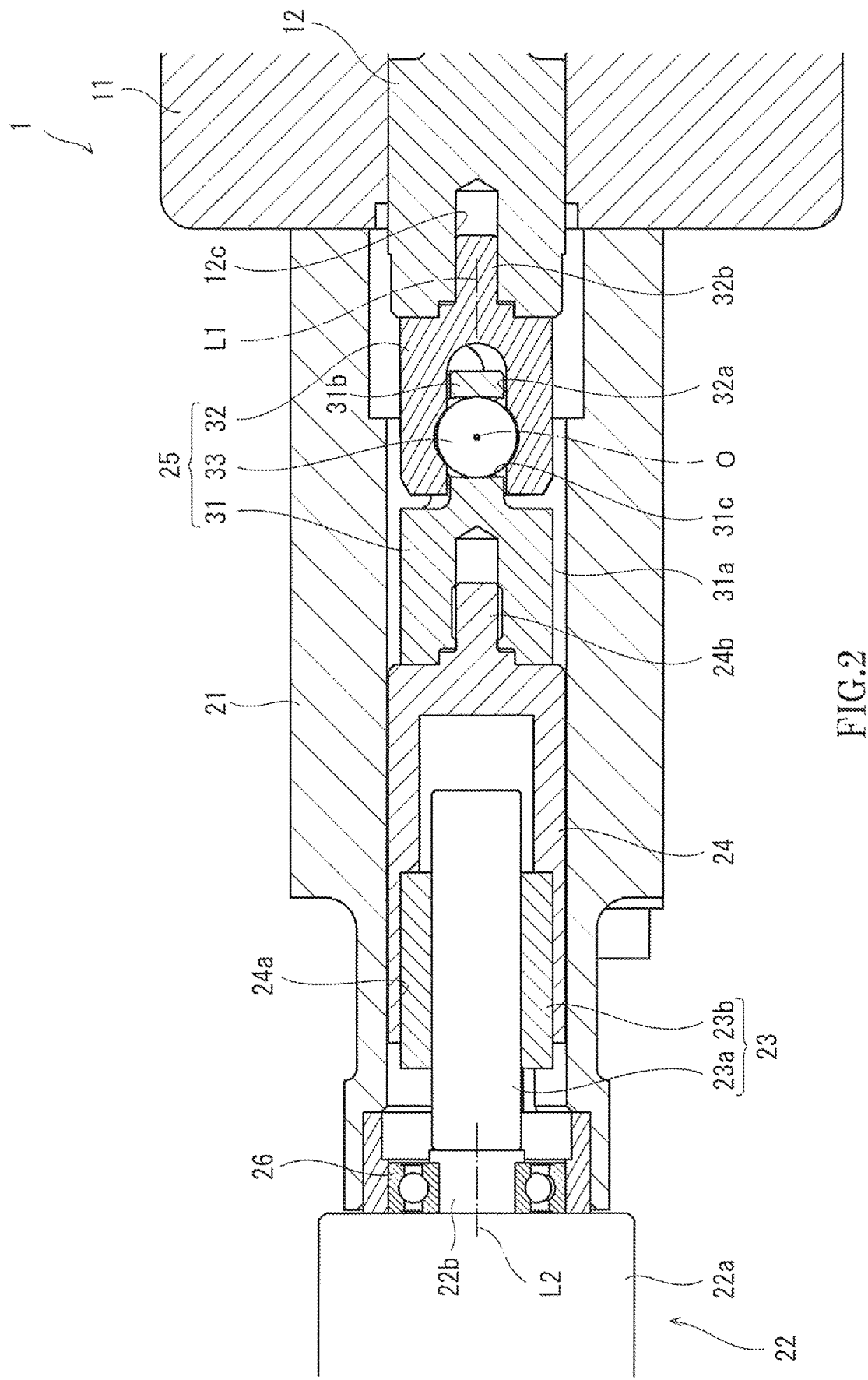
FIG. 2 is an enlarged sectional view of a region X of the spool valve shown in FIG. 1.

The electric actuator 13 is a so-called linear-motion electric actuator. The electric actuator 13 is supplied with electric power to make the spool 12 reciprocate in the axial direction. To be specific, as shown in FIG. 2, the electric actuator 13 includes a motor-side casing 21, a motor 22, a ball screw mechanism 23, an intermediate member 24, and a coupling member 25. The motor-side casing 21 is substantially cylindrical. An opening portion, located at the first side in the axial direction, of the motor-side casing 21 covers the one axial end portion of the spool 12. Moreover, this opening portion of the motor-side casing 21 is brought into contact with a side surface, located at the second side in the axial direction, of the housing 11, and in this state, is fastened to the housing 11. The motor-side casing 21 arranged as above extends in the axial direction, and the motor 22 is attached to an opening portion, located at the second side in the axial direction, of the motor-side casing 21.

The motor 22 is a so-called servomotor and includes a stator portion 22a and a rotor portion (including an output shaft) 22b. A controller (not shown) is connected to the stator portion 22a. The rotor portion 22b rotates in accordance with a voltage applied from the controller. The rotor portion 22b projects from the stator portion 22a into the motor-side casing 21 toward the first side in the axial direction. A bearing 26 is provided at an inner peripheral surface of the motor-side casing 21. The rotor portion 22b is rotatably supported by the bearing 26. The ball screw mechanism 23 is provided at a tip end (i.e., a right end) of the rotor portion 22b.

The ball screw mechanism 23 is a mechanism configured to convert a rotational motion of the rotor portion 22b into a linear motion. The ball screw mechanism 23 includes a screw shaft 23a and a nut 23b. The screw shaft 23a is a rod-shaped member extending in the axial direction, and an external thread is formed on an outer peripheral surface of the screw shaft 23a. The screw shaft 23a rotates integrally with the rotor portion 22b. The nut 23b is threadedly engaged with the screw shaft 23a. When the screw shaft 23a rotates, the nut 23b that is one example of a linear-motion member moves along the screw shaft 23a toward the first side or the second side in the axial direction. The nut 23b is fitted to the intermediate member 24.

The intermediate member 24 is formed in a substantially bottomed tubular shape. The intermediate member 24 includes an opening portion 24a at the second side in the axial direction. The nut 23b is fitted to and adhered to the opening portion 24a of the intermediate member 24. An outer diameter of the intermediate member 24 configured as above is slightly smaller than an inner diameter of the motor-side casing 21. The intermediate member 24 can move toward the first side or the second side in the axial direction together with the nut 23b. The intermediate member 24 includes a threaded portion 24b at a tip end portion thereof. The coupling member 25 is threadedly engaged with the threaded portion 24b.

Figure 3:
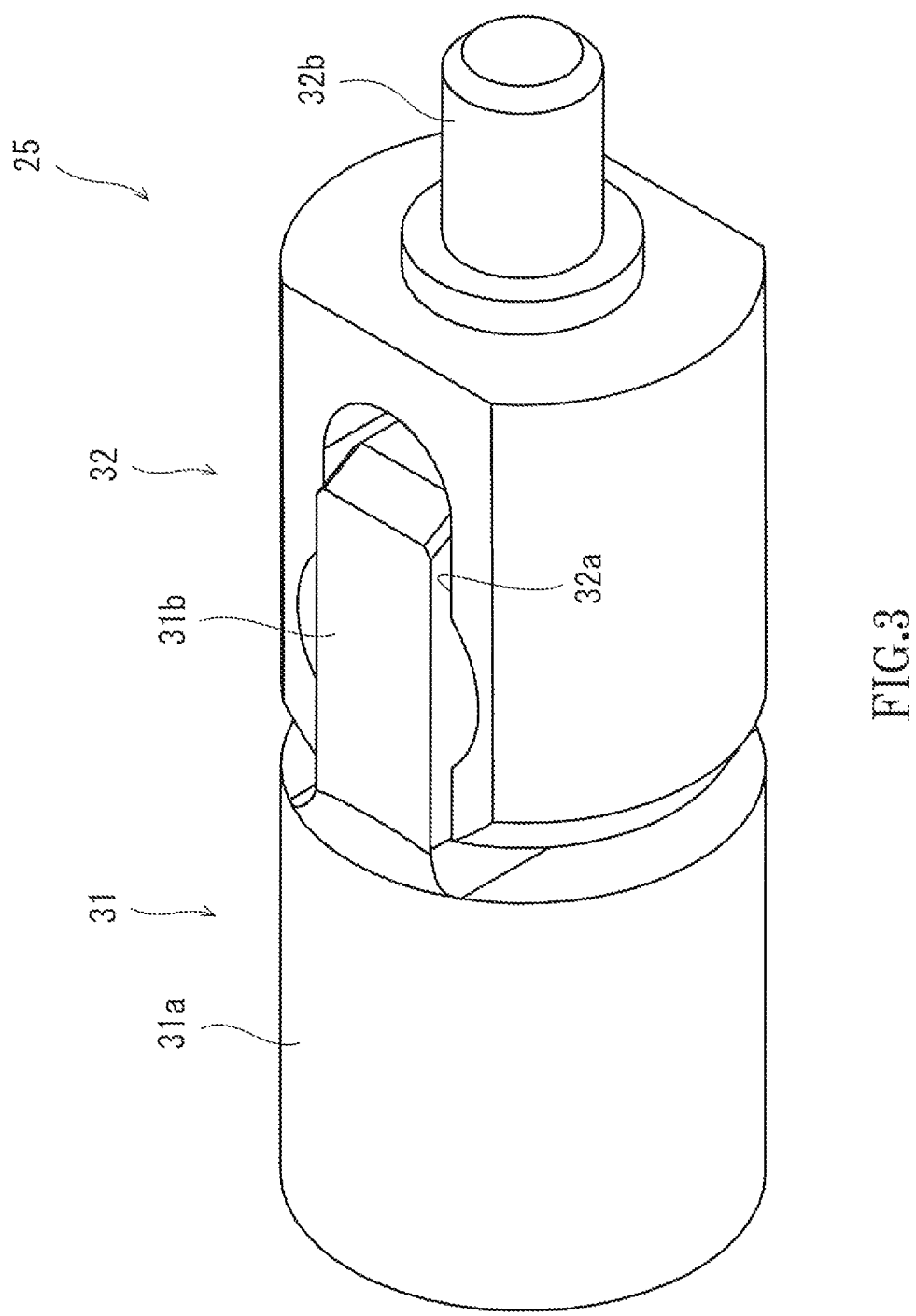
FIG. 3 is an enlarged perspective view of a coupling member of the spool valve shown in FIG. 1.

The coupling member 25 is a member coupling the intermediate member 24 and the spool 12, i.e., a member coupling the nut 23b and the spool 12 through the intermediate member 24. In order to allow the misalignment of the spool 12 relative to the nut 23b, the coupling member 25 is configured such that the spool 12 can tilt and slide relative to the nut 23b in all directions (including a first direction and a second direction described below) perpendicular to the axial direction. More specifically, the coupling member 25 is a so-called ball joint and includes a motor-side coupling portion 31, a spool-side coupling portion 32, and a ball 33 (also see FIG. 3).

The motor-side coupling portion 31 includes a columnar portion 31a and a projecting portion 31b. The columnar portion 31a is formed in a substantially columnar shape. A screw hole is formed at one axial end side of the columnar portion 31a along the axis. The threaded portion 24b of the intermediate member 24 is threadedly engaged with the screw hole of the columnar portion 31a. The projecting portion 31b is integrally formed at the other axial end of the columnar portion 31a. The projecting portion 31b is formed in a substantially flat plate shape and projects from the other axial end of the columnar portion 31a toward the first side in the axial direction. The projecting portion 31b of the motor-side coupling portion 31 having such shape is inserted into the spool-side coupling portion 32.

The spool-side coupling portion 32 is formed in a substantially columnar shape. An insertion groove 32a is formed at one axial end of the spool-side coupling portion 32. The insertion groove 32a extends toward the first side in the axial direction and penetrates in a perpendicular direction perpendicular to the axial direction. To be specific, the spool-side coupling portion 32 is formed such that a section thereof vertical to the perpendicular direction has a substantially U shape. The projecting portion 31b of the motor-side coupling portion 31 is inserted into the insertion groove 32a of the spool-side coupling portion 32 having such shape. The spool-side coupling portion 32 includes a threaded portion 32b at the other axial side thereof. A screw hole 12c is formed at one axial end of the spool 12, and the threaded portion 32b of the spool-side coupling portion 32 is threadedly engaged with the screw hole 12c. With this, the spool-side coupling portion 32 and the spool 12 are coupled to each other.

In the coupling member 25, a fitting hole 31c is formed in the vicinity of the middle of the projecting portion 31b of the motor-side coupling portion 31. The fitting hole 31c penetrates the projecting portion 31b in a thickness direction of the projecting portion 31b. The ball 33 having a substantially spherical shape is fitted in the fitting hole 31c. A portion of the insertion groove 32a of the spool-side coupling portion 32 which portion corresponds to the fitting hole 31c is formed so as to be curved outward in a width direction of the insertion groove 32a in accordance with the shape of the ball 33, and the ball 33 is fitted to this portion of the insertion groove 32a. To be specific, with the ball 33 fitted in the fitting hole 31c, the projecting portion 31b can be inserted into the insertion groove 32a of the spool-side coupling portion 32. The motor-side coupling portion 31 and the spool-side coupling portion 32 are locked to each other by the ball 33. With this, the nut 23b and the spool 12 are coupled to each other by the coupling member 25. When the nut 23b moves in the axial direction, the spool 12 can move to the first side or the second side in the axial direction in association with the nut 23b.

Figure 4A:
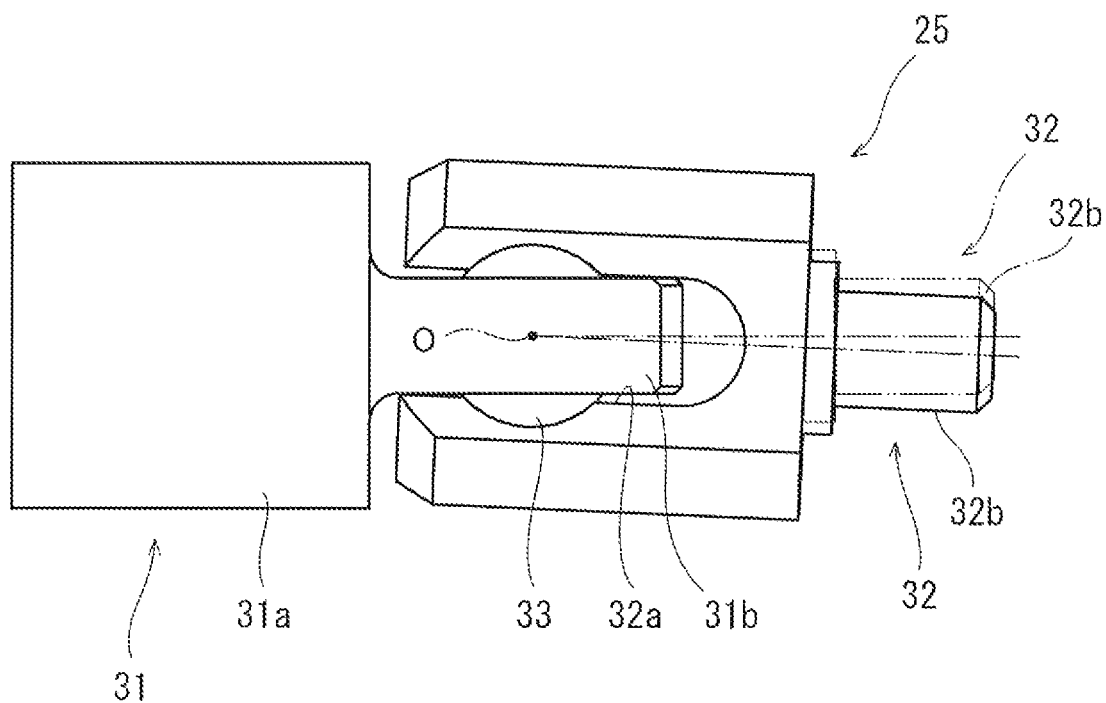
FIGS. 4A and 4B are diagrams showing a movable range of the coupling member shown in FIG. 3.
Figure 4B:
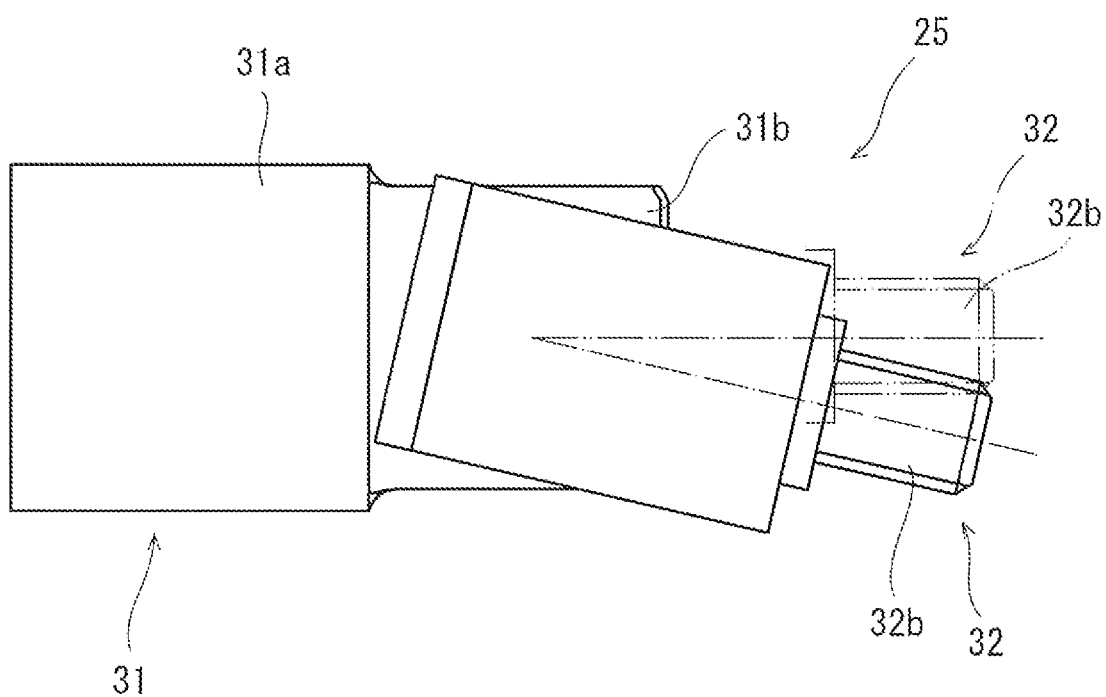

Since the motor-side coupling portion 31 and the spool-side coupling portion 32 are locked to each other by the ball 33, the coupling member 25 achieves the following functions. To be specific, the motor-side coupling portion 31 and the spool-side coupling portion 32 can tilt about a center point O of the ball 33. To be specific, the spool-side coupling portion 32 is configured to be tiltable relative to the motor-side coupling portion 31 in all directions perpendicular to an axis L1. For example, as shown in FIG. 4A, the spool-side coupling portion 32 can tilt relative to the motor-side coupling portion 31 about the center point O from a state shown by two-dot chain lines toward one side in a thickness direction (i.e., the first direction) of the projecting portion 31b. Moreover, as shown in FIG. 4B, the spool-side coupling portion 32 can tilt relative to the motor-side coupling portion 31 about the center point O from a state shown by two-dot chain lines toward one side in a direction (i.e., the second direction) perpendicular to the axial direction and the thickness direction.

Figure 5A:
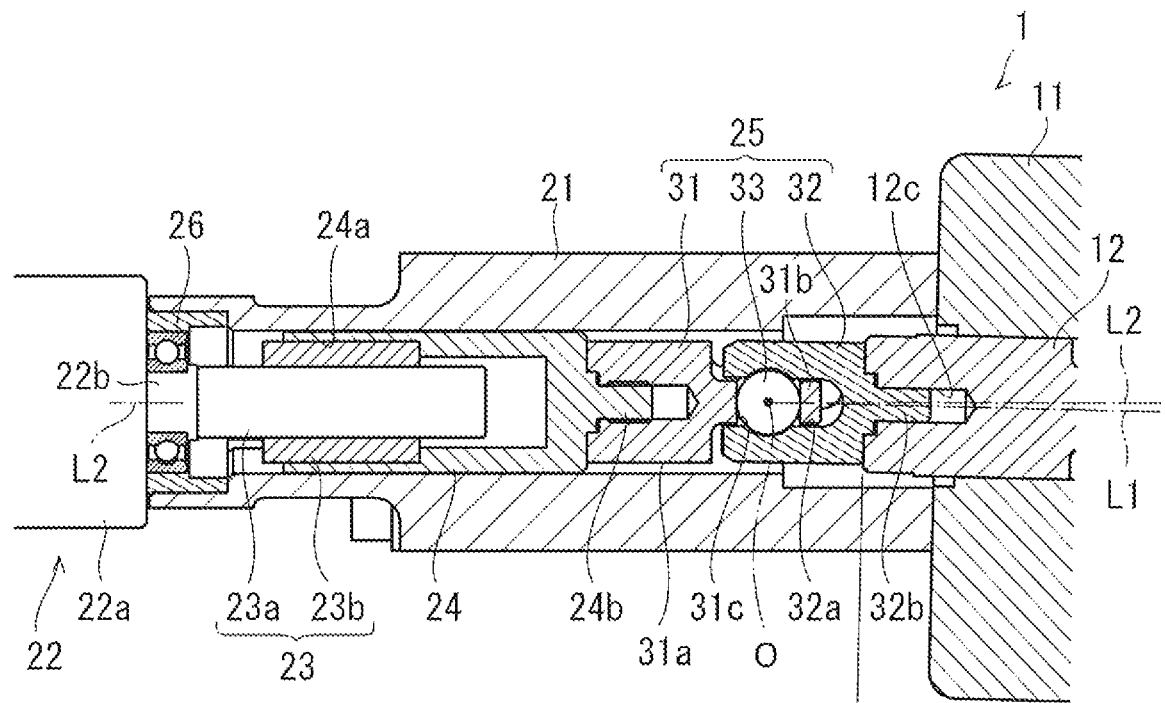
FIGS. 5A and 5B are diagrams for explaining that an axis of an output shaft and an axis of a spool in the spool valve of FIG. 1 tilt.

When the axis L1 of the spool 12 tilts relative to an axis L2 of the rotor portion 22b as shown in FIG. 5A, i.e., when misalignment occurs, the coupling member 25 having the above functions can allow the spool-side coupling portion 32 to tilt relative to the motor-side coupling portion 31 in any direction in accordance with the tilt state of the axis L1. With this, the tilt of the axis L1 of the spool 12 relative to the axis L2 of the rotor portion 22b can be allowed.

Figure 6A:
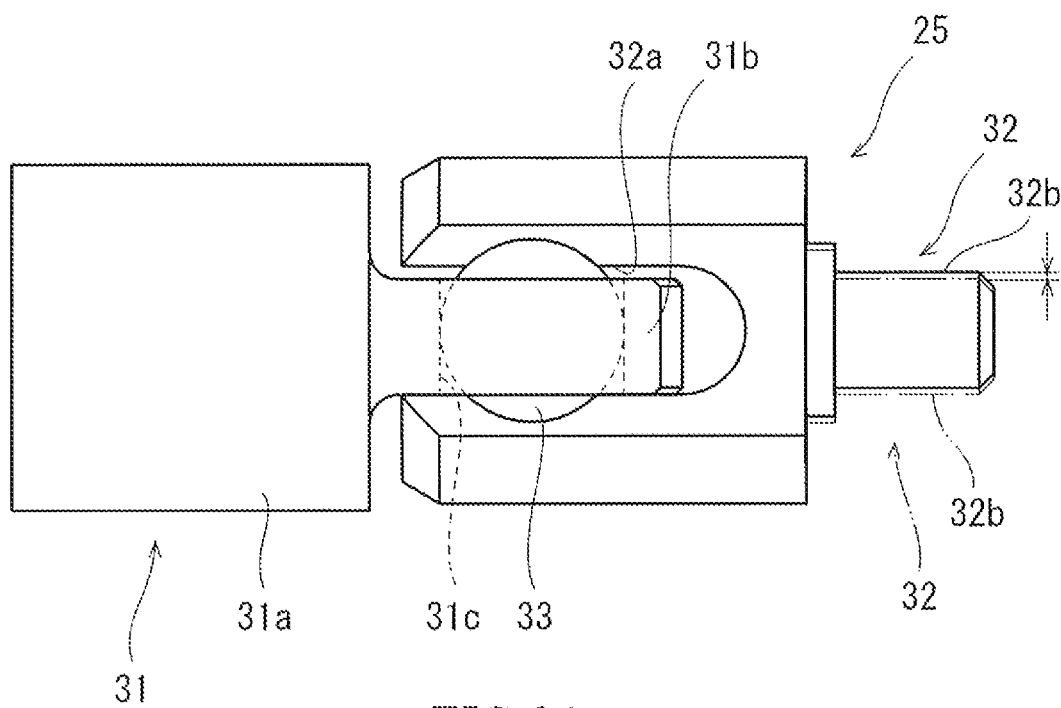
FIGS. 6A and 6B are diagrams showing the movable range of the coupling member shown in FIG. 3.
Figure 6B:
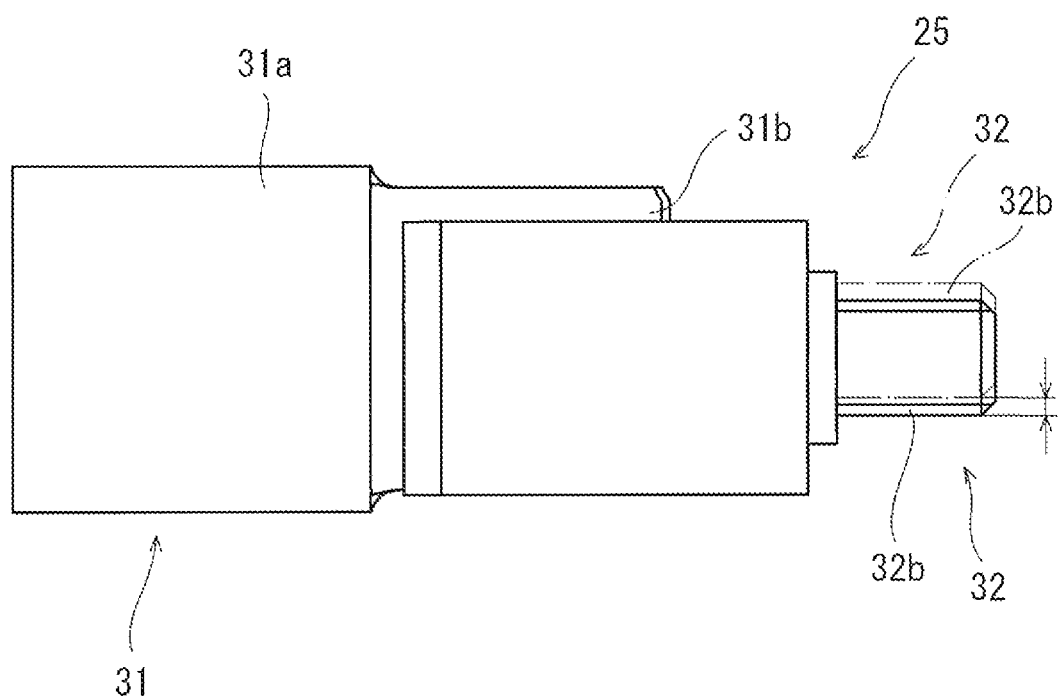
Figure 7:
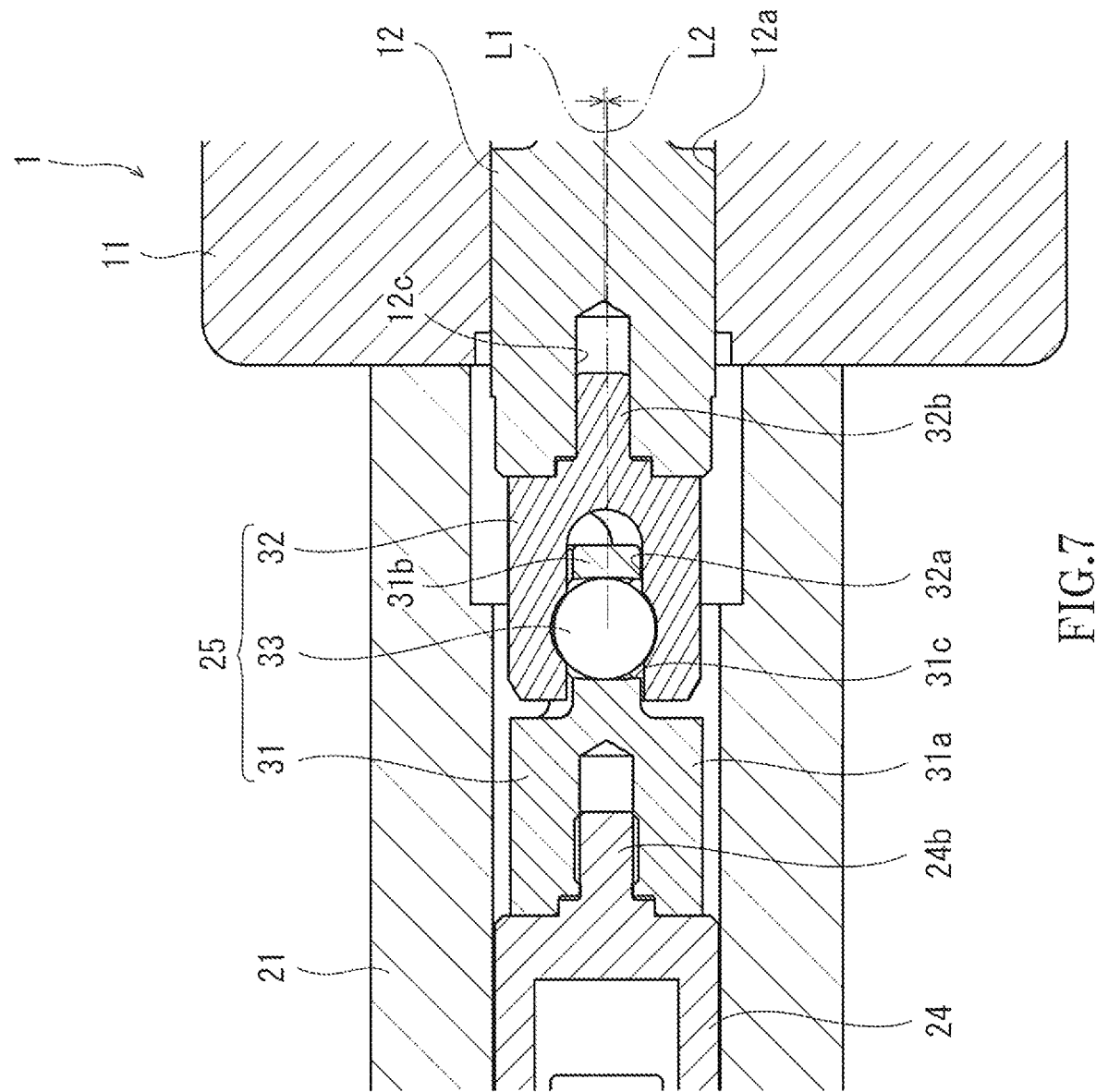
FIG. 7 is a diagram for explaining that the axis of the output shaft and the axis of the spool are eccentric to each other in the spool valve shown in FIG. 1.

Moreover, in the coupling member 25, the ball 33 is fitted in the motor-side coupling portion 31 and the spool-side coupling portion 32 so as to be movable relative to the motor-side coupling portion 31 and the spool-side coupling portion 32. To be specific, the ball 33 relatively moves in the motor-side coupling portion 31 in a direction in which the fitting hole 31c penetrates. Moreover, the ball 33 relatively moves in the spool-side coupling portion 32 in a direction in which the insertion groove 32a penetrates. With this, the motor-side coupling portion 31 can slide relative to the spool-side coupling portion 32 in two directions (i.e., an upper-lower direction (first direction) and a front-rear direction (second direction) when the axial direction is regarded as a left-right direction in FIG. 2) which are perpendicular to each other and also perpendicular to the axial direction (see FIGS. 6A and 6B). It should be noted that in FIG. 6A, the spool-side coupling portion 32 moves from a state shown by two-dot chain lines to a state shown by solid lines, and in FIG. 6B, the spool-side coupling portion 32 moves from a state shown by two-dot chain lines to a state shown by solid lines. With this, as shown in FIG. 7, when the axis L1 of the spool 12 is eccentric to the axis L2 of the rotor portion 22b, i.e., when misalignment occurs, the coupling member 25 can allow the spool-side coupling portion 32 to slide relative to the motor-side coupling portion 31 in any direction perpendicular to the axial direction in accordance with the eccentric state of the axis L1. With this, the eccentricity of the axis L1 of the spool 12 relative to the axis L2 of the rotor portion 22b can be allowed.

Figure 8A:
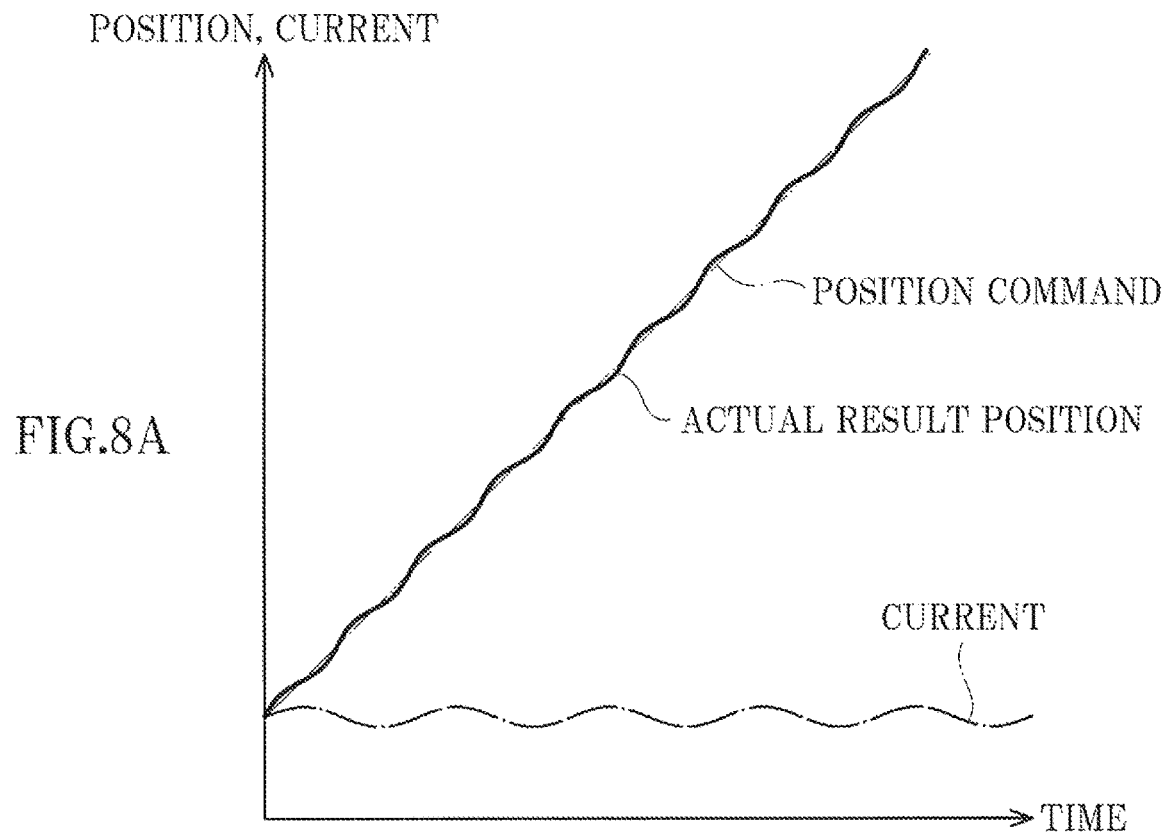
FIGS. 8A and 8B are graphs showing actual position results with respect to position commands in the spool valve.
Figure 8B:
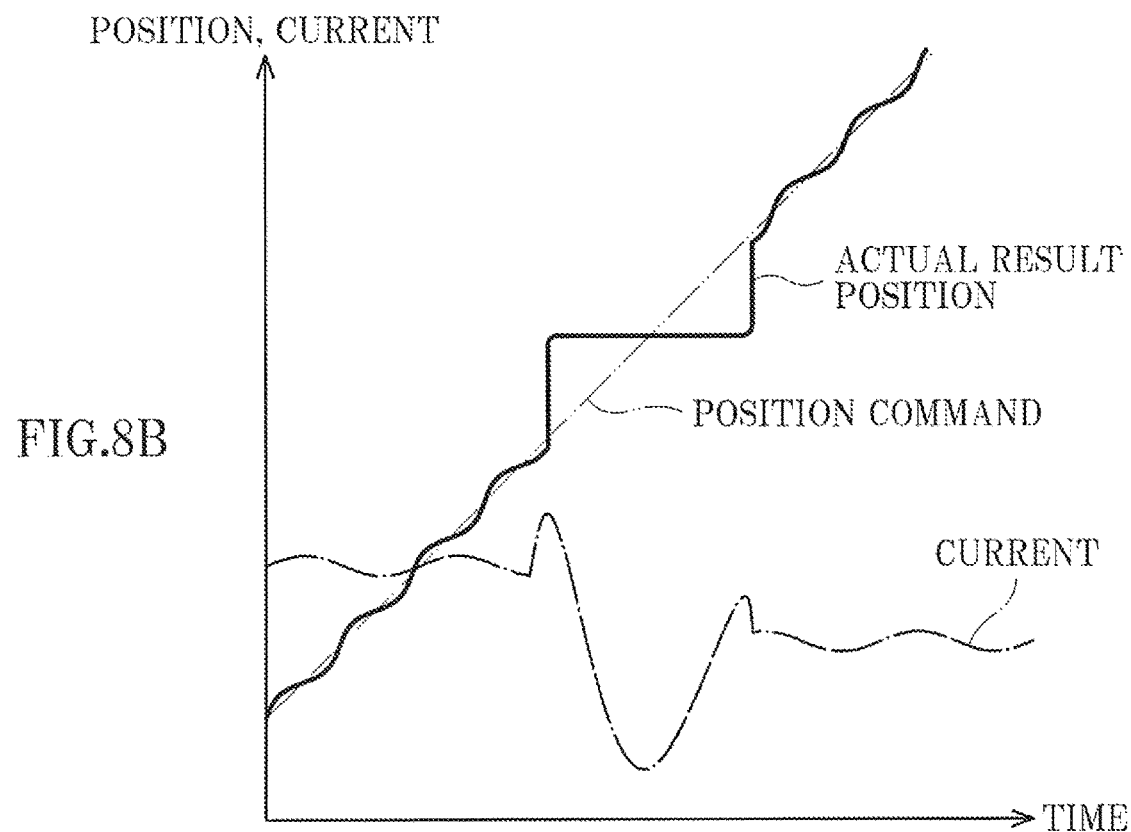

As above, the coupling member 25 can allow the misalignment of the axis L1 of the spool 12 relative to the axis L2 of the rotor portion 22b. With this, the spool 12 can be linearly held in the spool hole 11a without receiving a bending moment. To be specific, the spool 12 can be prevented from being pressed against an inner peripheral surface of the housing 11. With this, starting resistance, i.e., static friction force can be made smaller than that of a spool valve of conventional art. Therefore, as is clear from graphs of FIGS. 8A and 8B, a starting current when starting up the spool 12 can be made low in the spool valve 1. FIG. 8A shows time-lapse changes of a position command (two-dot chain line), an actual result position (solid line), and a current (one-dot chain line) in the spool valve 1. FIG. 8B shows time-lapse changes of the position command (two-dot chain line), the actual result position (solid line), and the current (one-dot chain line) in the spool valve of conventional art.

Figure 5B:
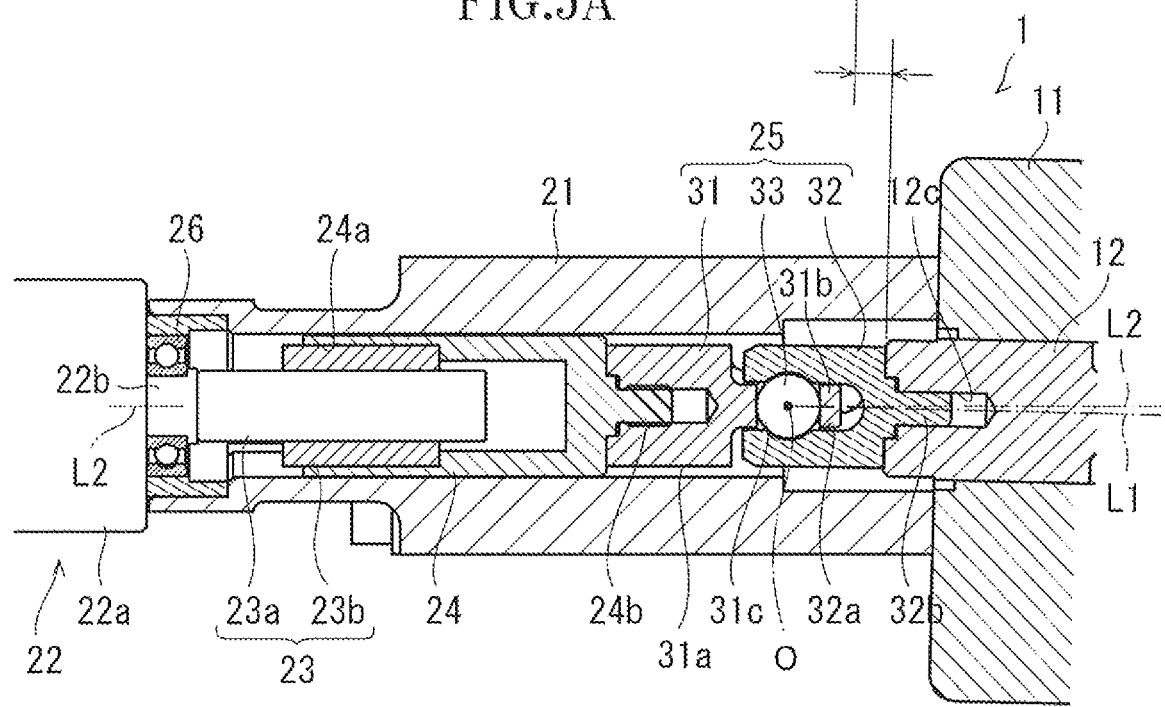

When the axis L1 of the spool 12 tilts relative to the axis L2 of the rotor portion 22b, the coupling member 25 finely adjusts a tilt angle of the spool-side coupling portion 32 relative the motor-side coupling portion 31 in accordance with the movement of the spool 12 as shown in FIG. 5B. With this, the spool 12 can be prevented from being pressed against the inner peripheral surface of the housing 11 when the spool 12 moves. Thus, a change in dynamic friction force can be made smaller than that of the spool valve of conventional art. Therefore, in the spool valve 1, as is clear from the graphs of FIGS. 8A and 8B, the position of the spool 12 can be controlled with respect to the position command with a higher degree of accuracy. Moreover, the spring mechanism 14 shown in FIG. 1 is provided at the other axial end portion of the spool 12.

The spring mechanism 14 includes a spring-side casing 41, a drive body 42, a first spring receiving member 43, a second spring receiving member 44, a coil spring 45, and a stopper member 46. The spring-side casing 41 is a member having a substantially bottomed tubular shape. An opening portion of the spring-side casing 41 is fastened to a side surface, located at the first side in the axial direction, of the housing 11 so as to cover the other axial end portion of the spool 12. Moreover, the spring-side casing 41 accommodates the drive body 42, the first spring receiving member 43, the second spring receiving member 44, the coil spring 45, and the stopper member 46.

The drive body 42 is a substantially rod-shaped member and includes a threaded portion 42a at a tip end side thereof. To be specific, the threaded portion 42a of the drive body 42 is threadedly engaged with the other axial end portion of the spool 12. The drive body 42 is arranged substantially coaxially with the spool 12 and extends toward the first side in the axial direction so as to project from the spool 12. The drive body 42 includes a head portion 42b at a base end side thereof. The first spring receiving member 43, the second spring receiving member 44, the coil spring 45, and the stopper member 46 are externally attached to an intermediate portion 42c located between the head portion 42b and the threaded portion 42a.

The first spring receiving member 43 is formed in a substantially hat shape and includes a main body portion 43a and a flange portion 43b. The main body portion 43a is formed in a substantially bottomed tubular shape, and an insertion hole 43c into which the drive body 42 is inserted is formed at the main body portion 43a around an axis of the main body portion 43a. The flange portion 43b is formed at an opening end portion of the main body portion 43a over the entire periphery in the circumferential direction. With the intermediate portion 42c of the drive body 42 inserted into the first spring receiving member 43, the first spring receiving member 43 covers the other axial end portion of the spool 12. When the spool 12 is located at the neutral position, a bottom portion of the main body portion 43a of the first spring receiving member 43 contacts the other axial end of the spool 12, and the flange portion 43b contacts the side surface, located at the first side in the axial direction, of the housing 11. As above, with the first spring receiving member 43 supported by the side surface of the housing 11, the first spring receiving member 43 is externally attached to one axial end side of the drive body 42. Moreover, the second spring receiving member 44 is externally attached to the drive body 42 at a position away from the first spring receiving member 43 toward the first side in the axial direction.

The second spring receiving member 44 is formed in a substantially circular plate shape, and an insertion hole 44c into which the drive body 42 is inserted is formed at the second spring receiving member 44 around an axis of the second spring receiving member 44. The intermediate portion 42c of the drive body 42 is inserted into the second spring receiving member 44 having such shape. As described above, the second spring receiving member 44 is arranged away from the first spring receiving member 44. The insertion hole 44c of the second spring receiving member 44 arranged as above is smaller in diameter than the head portion 42b of the drive body 42, and therefore, the second spring receiving member 44 is not detached from the head portion 42b side. The coil spring 45 which is externally attached to the drive body 42 is interposed between the second spring receiving member 44 and the first spring receiving member 43 arranged as above. The coil spring 45 is a so-called compression coil spring. The coil spring 45 in a compressed state is interposed between the two spring receiving members 43 and 44. With this, when the spool 12 is located at the neutral position, the first spring receiving member 43 is pressed against the other axial end of the spool 12 and the side surface, located at the first side in the axial direction, of the housing 11, and the second spring receiving member 44 is pressed against the head portion 42b of the drive body 42. A portion, located at the first side in the axial direction, of an inner peripheral surface of the spring-side casing 41 is smaller in diameter than the other portion, and therefore, a step portion 41a is formed thereat. When the spool 12 is located at the neutral position, an outer peripheral edge portion of the second spring receiving member 44 contacts and is supported by the step portion 41a.

In the spring mechanism 14 configured as above, when the spool 12 is moved by the electric actuator 13 from the neutral position toward the first side in the axial direction, the first spring receiving member 43 also moves toward the first side in the axial direction. On the other hand, the second spring receiving member 44 cannot move and stays thereat since the outer peripheral edge portion of the second spring receiving member 44 is supported by the step portion 41a. With this, a space between the two spring receiving members 43 and 44 narrows, and this compresses the coil spring 45. Then, the coil spring 45 applies biasing force to the spool 12 through the first spring receiving member 44 and the drive body 42 in such a direction that the spool 12 returns to the neutral position. To be specific, the coil spring 45 applies to the spool 12 the biasing force acting toward the second side in the axial direction against pressing force applied from the electric actuator 13.

When the spool 12 is moved by the electric actuator 13 from the neutral position toward the second side in the axial direction, the second spring receiving member 44 is moved by the head portion 42b toward the second side in the axial direction. On the other hand, the first spring receiving member 43 cannot move and stays thereat since the flange portion 43b is supported by the housing 11. With this, the space between the two spring receiving members 43 and 44 narrows, and this compresses the coil spring 45. Then, the coil spring 45 applies the biasing force to the spool 12 through the second spring receiving member 44 and the drive body 42 in such a direction that the spool 12 returns to the neutral position. To be specific, the coil spring 45 applies to the spool 12 the biasing force acting toward the first side in the axial direction against the pressing force applied from the electric actuator 13.

On the other hand, when the spool 12 is located at the neutral position, the first spring receiving member 43 is supported by the side surface of the housing 11, and the second spring receiving member 44 is supported by the step portion 41a of the spring-side casing 41. Therefore, the biasing force of the coil spring 45 does not act on the spool 12. On this account, when the pressing force applied from the electric actuator 13 to the spool 12 is set to zero, the spool 12 can be made to return to the neutral position. Moreover, as described above, the spring mechanism 14 includes the stopper member 46.

The stopper member 46 restricts the compression of the coil spring 45 such that a compression amount of the coil spring 45 does not become larger than a predetermined distance. To be specific, the stopper member 46 is formed in a substantially cylindrical shape. The stopper member 46 is arranged inside the coil spring 45 and externally attached to the drive body 42. The stopper member 46 is arranged between the two spring receiving members 43 and 44. The stopper member 46 arranged as above is formed to be shorter than a distance between the bottom portion of the main body portion 43a and the second spring receiving member 44 in the axial direction by the above-described predetermined distance. With this, the movement of the spool 12 toward the first or second side in the axial direction by a predetermined amount or more can be restricted.

In the spool valve 1 configured as above, the motor 22 of the electric actuator drives in accordance with the voltage applied from the controller, and this rotates the rotor portion 22b and the screw shaft 23a. Moreover, when the screw shaft 23a rotates, the nut 23b moves toward the first side (or the second side) in the axial direction by a distance corresponding to a rotational direction and rotational frequency of the screw shaft 23a, and with this, the nut 23b pushes the spool 12 toward the first side in the axial direction (or pulls the spool 12 toward the second side in the axial direction) through the intermediate member 24 and the coupling member 25. With this, the position of the spool 12 changes, and this changes the connection status and opening degree of the three oil passages 11b to 11d.

In the spool valve 1, the nut 23b pushes (or pulls) the spool 12 through the coupling member 25. Therefore, even when the axis L1 of the spool 12 is misaligned with respect to the axis L2 of the rotor portion 22b, such misalignment of the axis L1 of the spool 12 with respect to the axis L2 of the rotor portion 22b can be absorbed. Therefore, an increase in the friction force acting on the spool 12 due to the misalignment can be suppressed. With this, deterioration of position controllability of the spool 12 due to the misalignment can be suppressed, and the position of the spool 12 can be controlled with respect to the position command with a higher degree of accuracy. To be specific, the opening degree of the spool valve 1 can be controlled with a higher degree of accuracy. Moreover, since the static friction force of the spool valve 1 can be made smaller than that of the spool valve of conventional art, the starting current when starting up the spool 12 can be made low.

In the spool valve 1, the spool 12 can tilt by the coupling member 25 in any direction relative to the rotor portion 22b. Therefore, even when the axis L1 of the spool 12 is misaligned in any direction relative to the axis L2 of the rotor portion 22b, such misalignment can be absorbed. With this, positional accuracy of the spool 12 relative to the electric actuator 13 at the time of assembling can be suppressed to a low level. Moreover, since the electric actuator 13 and the spool 12 can be coupled to each other only by fitting the ball 33 into the motor-side coupling portion 31 of the coupling member 25 and inserting the ball 33 into the spool-side coupling portion 32, the spool valve 1 is easily assembled, and parts can be easily replaced.

In the spool valve 1, a ball joint constituted by the two coupling portions 31 and 32 and the ball 33 and having a simple structure is adopted as the coupling member 25. Therefore, complication of the structure of the spool valve 1 can be suppressed, and the number of parts of the spool valve 1 can be made small. With this, the manufacturing cost of the spool valve 1 can be suppressed.

Moreover, in the spool valve 1, in order to return the spool 12 to the neutral position from a state after the movement, the motor 22 is driven by the current from the controller to rotate the rotor portion 22b and the screw shaft 23a in a direction opposite to the above-described direction. With this, the nut 23b moves toward the second side (or the first side) in the axial direction, and the spool 12 returns to the neutral position. At this time, the spool 12 returns to the neutral position while being biased toward the neutral position by the biasing force of the spring mechanism 14. When the spool 12 returns to the neutral position, the two spring receiving members 43 and 44 respectively contact the side surface of the housing 11 and the step portion 41a of the spring-side casing 41 in the spring mechanism 14. Thus, the biasing force applied to the spool 12 becomes zero. When the motor 22 stops driving due to an undesired state, such as failure of the motor 22 or the controller or breaking of a signal wire, the spring mechanism 14 returns the spool 12 to the neutral position. To be specific, in the spool valve 1, fail-safe can be realized by the spring mechanism 14.

Embodiment 2

The spool valve 1A of Embodiment 2 is similar in configuration to the spool valve 1 of Embodiment 1. Therefore, the following will mainly describe components of the spool valve 1A of Embodiment 2 which are different from those of the spool valve 1 of Embodiment 1. The same reference signs are used for the same components, and explanations thereof are omitted.

Figure 9:
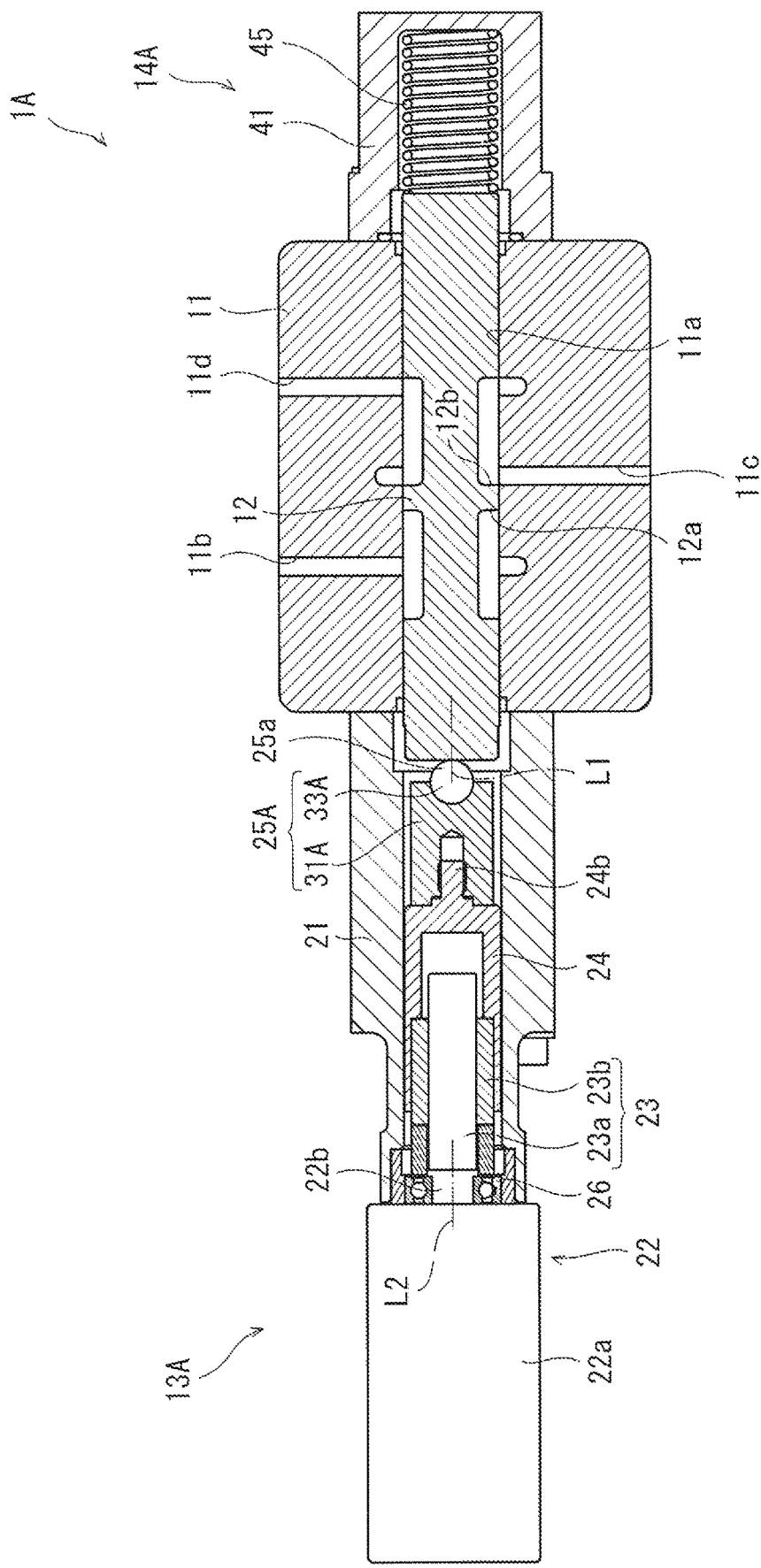
FIG. 9 is a sectional view showing the spool valve according to Embodiment 2 of the present invention.

As shown in FIG. 9, the spool valve 1A of Embodiment 2 includes the housing 11, the spool 12, an electric actuator 13A, and a spring mechanism 14A. As shown in FIG. 2, the electric actuator 13A includes the motor-side casing 21, the motor 22, the ball screw mechanism 23, the intermediate member 24, and a contact member 25A. The contact member 25A includes a coupling portion 31A and a ball 33A. A partially spherical recess 31d is formed at a tip end portion of the coupling portion 31A. The ball 33A is fitted in the partially spherical recess 31d, and the partially spherical recess 31d is caulked. With this, a pressing portion 25a having a partially spherical shape is formed at a tip end portion of the contact member 25A. The pressing portion 25a is pressed against and contacts the one axial end portion of the spool 12. Moreover, the spring mechanism 14A is provided at the other axial end portion of the spool 12.

The spring mechanism 14A includes the spring-side casing 41 and the coil spring 45. The coil spring 45 is accommodated in the spring-side casing 41 and interposed between the other axial end portion of the spool 12 and the bottom portion of the spring-side casing 41. The coil spring 45 arranged as above biases the spool 12 toward the second side in the axial direction to press the spool 12 against the ball 33A. To be specific, the coil spring 45 applies to the spool 12 the biasing force acting against the pressing force of the electric actuator 13A to press the ball 33A against the spool 12 at all times.

In the spool valve 1A configured as above, when the driving of the motor 22 of the electric actuator 13A is in a stop state, for example, the first oil passage 11b is disconnected, and the second oil passage 11c and the third oil passage 11d are connected to each other. On the other hand, when the motor 22 drives by the current supplied from the controller to the electric actuator 13A, the motor 22 rotates in accordance with the current to move the nut 23b toward the first side in the axial direction. With this, the spool 12 is pushed toward the first side in the axial direction by the contact member 25A, and therefore, moves toward the first side in the axial direction. By the above movement of the spool 12, the connection status and opening degree of the three oil passages 11b to 11d can be changed.

In the spool valve 1A, the electric actuator 13A pushes the spool 12 through the ball 33A. Therefore, even when the axis L1 of the spool 12 is misaligned with respect to the axis L2 of the rotor portion 22b, the ball 33A keeps on contacting and pushing the spool 12 while changing its position on the one axial end of the spool 12. The ball 33A and the spool 12 are not fixed to each other and are in point contact with each other. Therefore, the spool 12 can be held in the spool hole without receiving the bending moment. Even when the axis L1 of the spool 12 tilts relative to or is eccentric to the axis L2 of the rotor portion 22b, i.e., even when the axis L1 of the spool 12 is misaligned with respect to the axis L2 of the rotor portion 22b, the electric actuator 13 can push the spool 12 in the axial direction by the above point contact. Thus, the increase in the friction force acting on the spool 12 due to the misalignment can be suppressed. Therefore, the deterioration of the position controllability of the spool due to the misalignment can be suppressed, and the position of the spool 12 can be controlled with respect to the position command with a higher degree of accuracy. To be specific, the opening degree of the spool valve 1 can be controlled with a higher degree of accuracy. The static friction force of the spool valve 1 can be made lower than that of the spool valve of conventional art, and therefore, the starting current when starting up the spool 12 can be made low.

Other Embodiments

In the spool valve 1 of Embodiment 1, the ball joint is adopted as the coupling member 25. However, the coupling member 25 is not limited to the ball joint. For example, a universal joint may be adopted as the coupling member 25. Moreover, the coupling member 25 may be constituted by a below-described caulking structure. To be specific, the ball 33 is integrally formed at a tip end of the motor-side coupling portion 31 like a shoe, and a partially spherical recess corresponding to the ball 33 is formed at one of axial end portions of the spool-side coupling portion 32. The ball 33 is inserted in the partially spherical recess, and the partially spherical recess is caulked. The ball 33 is allowed to rotate in the partially spherical recess. With this, the motor-side coupling portion 31 and the spool-side coupling portion 32 can be coupled to each other so as to be angularly displaceable about the center point O of the ball 33. As above, the coupling member 25 is only required to be configured such that the motor-side coupling portion 31 and the spool-side coupling portion 32 are angularly displaceable about the center point O located between the motor-side coupling portion 31 and the spool-side coupling portion 32. The coupling member 25 is configured to allow both the tilt and the eccentricity. However, the coupling member 25 does not necessarily have to allow both the tilt and the eccentricity and may be configured to allow one of the tilt and the eccentricity. The directions in which the tilt and the eccentricity are allowed do not necessarily have to be all directions perpendicular to the axial direction and may be one specific direction.

In the spool valve 1 of Embodiment 1, the intermediate member 24 and the motor-side coupling portion 31 of the coupling member 25 are formed separately. However, the intermediate member 24 and the motor-side coupling portion 31 of the coupling member 25 may be formed integrally. Similarly, the spool 12 and the spool-side coupling portion 32 are formed separately but may be formed integrally. Moreover, the motor-side coupling portion 31 of the coupling member 25 does not necessarily have to be coupled to or formed integrally with the intermediate member 24 and may be coupled to or formed integrally with the spool 12. In this case, the spool-side coupling portion 32 may be coupled to or formed integrally with the intermediate member 24.

Moreover, the coupling member 25 does not necessarily have to be angularly displaceable in all directions about the center point O. As shown in FIG. 4A, the spool-side coupling portion 32 may be configured to tilt relative to the motor-side coupling portion 31 only in the thickness direction of the projecting portion 31b. Or, as shown in FIG. 4B, the spool-side coupling portion 32 may be configured to tilt relative to the motor-side coupling portion 31 only in a direction perpendicular to the axial direction and the thickness direction. Each of these configurations is especially useful when high accuracy of attaching the electric actuator 13 to the side surface of the housing 11 can be secured only in one direction (in FIG. 1, the upper-lower direction or the front-rear direction).

Moreover, in the spool valve 1 of Embodiment 1, the spring mechanism 14 is arranged close to the other axial end portion of the spool 12. However, the spring mechanism 14 does not necessarily have to be arranged at this position. For example, the spring mechanism 14 may be arranged close to the one axial end portion of the spool 12. In this case, the first spring receiving member 43 is arranged so as to cover the one axial end portion of the spool 12, and the second spring receiving member 44 is arranged so as to contact a tip end surface of the intermediate member. Moreover, the coil spring 45 is interposed between the two spring receiving members 43 and 44, and with this, the spring mechanism 14 can be arranged close to the one axial end portion of the spool 12.

The spring mechanism 14 is adopted as a mechanism configured to accurately return the spool 12 to the neutral position. However, the mechanism having such function is not limited to the spring mechanism 14, and for example, may be configured such that: as long as pressing force having a predetermined value or more does not act on the spool 12, the spool 12 does not move from the neutral position by a detent mechanism; or the position of the spool 12 is accurately detected by a position sensor, and reproducibility of the movement to the neutral position is improved.

Moreover, in the spool valves 1 of Embodiments 1 and 2, the ball screw mechanism 23 is directly coupled to the rotor portion 22b. However, the rotor portion 22b and the ball screw mechanism 23 may be coupled to each other through a transmission mechanism or the like. In this case, the motor 22 is not arranged coaxially with the ball screw mechanism 23, and the motor 22 can be arranged side by side with the ball screw mechanism 23. Furthermore, a linear-motion converting mechanism, such as a sliding screw mechanism or a trapezoidal screw mechanism, may be adopted instead of the ball screw mechanism 23.

REFERENCE SIGNS LIST 1, 1A spool valve
11 housing
11a spool hole
12 spool
13, 13A electric actuator
14, 14A spring mechanism (biasing mechanism)
22 motor
22b output shaft
23 ball screw mechanism (linear-motion converting mechanism)
23b nut (linear-motion member)
25 coupling member
25A contact member
25a pressing portion
31 motor-side coupling portion
32 spool-side coupling portion
33 ball

The invention claimed is:
1. A spool valve comprising:
a housing including a spool hole;
a spool inserted into the spool hole of the housing so as to be movable in an axial direction; and
an electric actuator configured to move the spool in the axial direction, wherein:
the electric actuator includes
an electric motor configured to rotate an output shaft,
a linear-motion converting mechanism including a linear-motion member configured to be linearly movable, the linear-motion converting mechanism being configured to convert a rotational motion of the output shaft into a linear motion of the linear-motion member, and a coupling member coupling the linear-motion member and the spool such that the spool moves in accordance with the linear motion of the linear-motion member;

the coupling member allows at least one of tilt and eccentricity of an axis of the spool relative to an axis of the linear-motion member, and the coupling member includes:
  a motor-side coupling portion provided at the linear-motion member and
  a spool-side coupling portion provided at the spool,
wherein the motor-side coupling portion and the spool-side coupling portion are configured to be displaceable relative to each other in two directions which are perpendicular to each other and are perpendicular to the axial direction.

2. The spool valve according to claim 1, wherein the coupling member allows the tilt of the spool relative to the linear-motion member in all directions perpendicular to the axial direction.

3. The spool valve according to claim 2, wherein the coupling member is constituted by a ball joint including the motor-side coupling portion, the spool-side coupling portion, and a ball interposed between the motor-side coupling portion and the spool-side coupling portion to couple the motor-side coupling portion and the spool-side coupling portion, the motor-side coupling portion and the spool-side coupling portion being configured to rotate relative to each other about a center point of the ball.

4. The spool valve according to claim 3, further comprising a biasing mechanism configured to apply biasing force against a load received by the spool from the electric actuator in the axial direction, wherein:
  the spool moves toward a first side or a second side in the axial direction from a neutral position by the load applied from the electric actuator;
  the electric actuator is coupled to one of axial end portions of the spool;
  the biasing mechanism applies the biasing force to the spool against the load from the electric actuator such that the spool returns to the neutral position; and
  the biasing mechanism is arranged close to the other axial end portion of the spool.

5. The spool valve according to claim 2, wherein the coupling member allows the eccentricity of the spool relative to the linear-motion member in all directions perpendicular to the axial direction.

6. The spool valve according to claim 5, further comprising a biasing mechanism configured to apply biasing force against a load received by the spool from the electric actuator in the axial direction, wherein:
  the spool moves toward a first side or a second side in the axial direction from a neutral position by the load applied from the electric actuator;
  the electric actuator is coupled to one of axial end portions of the spool;
  the biasing mechanism applies the biasing force to the spool against the load from the electric actuator such that the spool returns to the neutral position; and
  the biasing mechanism is arranged close to the other axial end portion of the spool.

7. The spool valve according to claim 2, further comprising a biasing mechanism configured to apply biasing force against a load received by the spool from the electric actuator in the axial direction, wherein:
  the spool moves toward a first side or a second side in the axial direction from a neutral position by the load applied from the electric actuator;
  the electric actuator is coupled to one of axial end portions of the spool;
  the biasing mechanism applies the biasing force to the spool against the load from the electric actuator such that the spool returns to the neutral position; and
  the biasing mechanism is arranged close to the other axial end portion of the spool.

8. The spool valve according to claim 1, wherein the coupling member allows the eccentricity of the spool relative to the linear-motion member in all directions perpendicular to the axial direction.

9. The spool valve according to claim 8, further comprising a biasing mechanism configured to apply biasing force against a load received by the spool from the electric actuator in the axial direction, wherein:
  the spool moves toward a first side or a second side in the axial direction from a neutral position by the load applied from the electric actuator;
  the electric actuator is coupled to one of axial end portions of the spool;
  the biasing mechanism applies the biasing force to the spool against the load from the electric actuator such that the spool returns to the neutral position; and
  the biasing mechanism is arranged close to the other axial end portion of the spool.

10. The spool valve according to claim 1, further comprising a biasing mechanism configured to apply biasing force against a load received by the spool from the electric actuator in the axial direction, wherein:
  the spool moves toward a first side or a second side in the axial direction from a neutral position by the load applied from the electric actuator;
  the electric actuator is coupled to one of axial end portions of the spool;
  the biasing mechanism applies the biasing force to the spool against the load from the electric actuator such that the spool returns to the neutral position; and
  the biasing mechanism is arranged close to the other axial end portion of the spool.

11. The spool valve according to claim 1, wherein:
  the coupling member includes a ball interposed between the motor-side coupling portion and the spool-side coupling portion to couple the motor-side coupling portion and the spool-side coupling portion;
  the spool-side coupling portion includes an insertion groove extending toward a first side in the axial direction and penetrating in a perpendicular direction perpendicular to the axial direction;
  the ball is fitted to the insertion groove;
  the motor-side coupling portion includes a projecting portion inserted into the insertion groove;
  the projecting portion includes a fitting hole in which the ball is fitted; and
  the motor-side coupling portion and the spool-side coupling portion are coupled to each other by the ball in such a manner that with the ball fitted in the fitting hole, the projecting portion is inserted into the insertion groove of the spool-side coupling portion.

* * * * *